May 8, 1962 J. WENDERSKI 3,033,503
FISHERMAN'S POLE REST AND A HOLDER THEREFOR
Filed Dec. 16, 1958 2 Sheets-Sheet 1
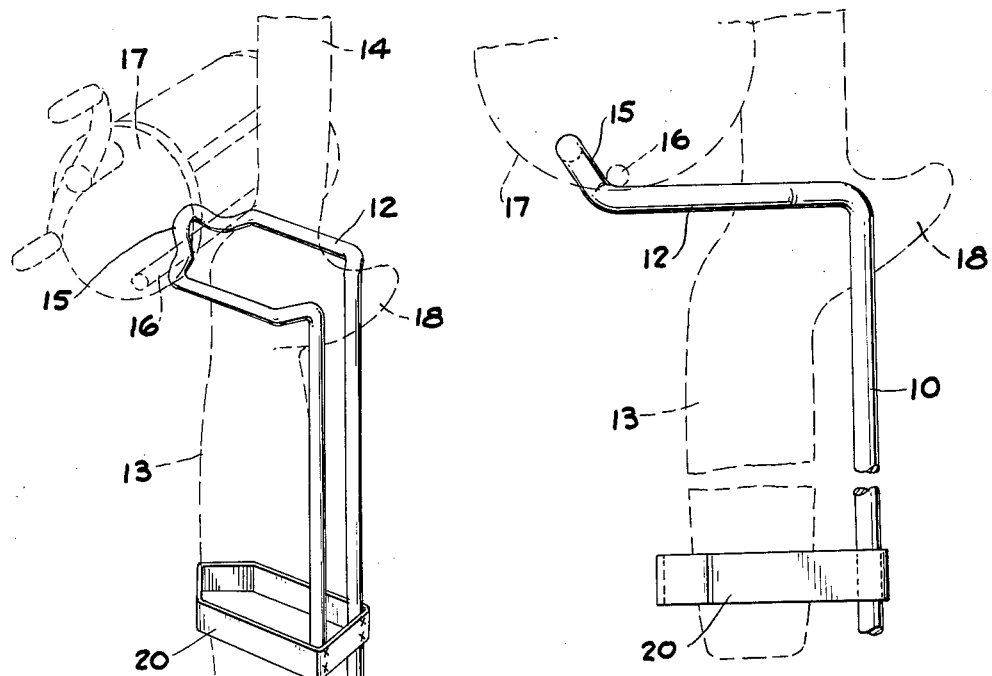
Fig. 1
Fig. 2
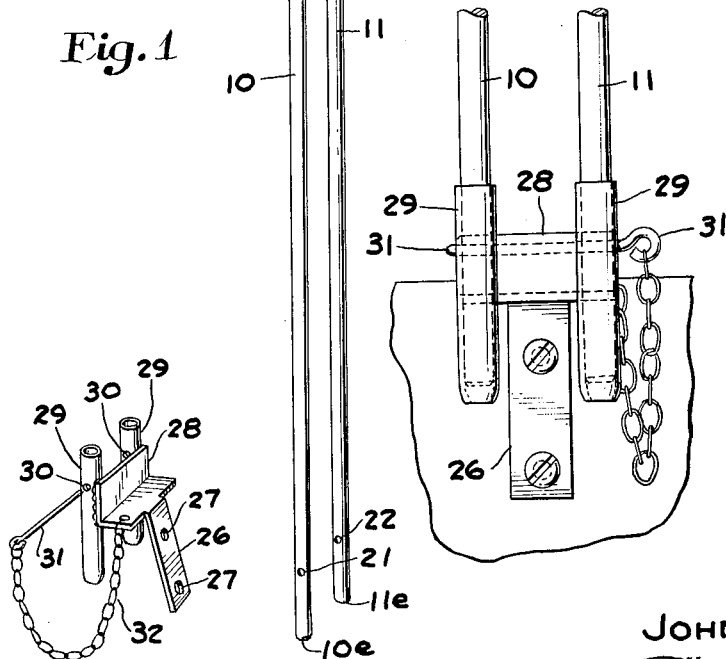
Fig. 3
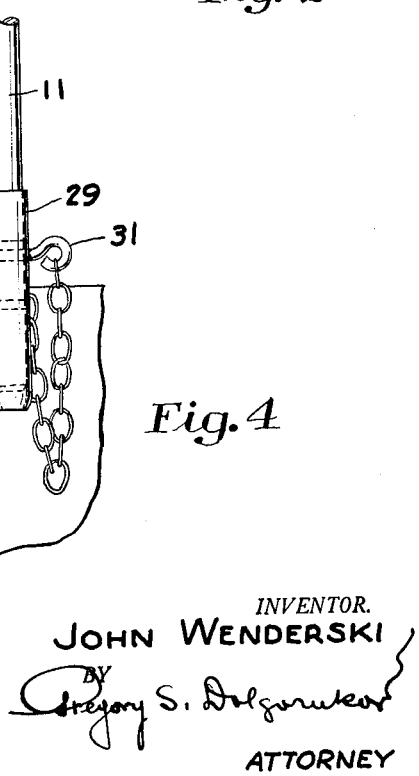
Fig. 4
INVENTOR.
JOHN WENDERSKI
BY Gregory S. Dolgorukov
ATTORNEY May 8, 1962 J. WENDERSKI 3,033,503
FISHERMAN'S POLE REST AND A HOLDER THEREFOR
Filed Dec. 16, 1958 2 Sheets-Sheet 2
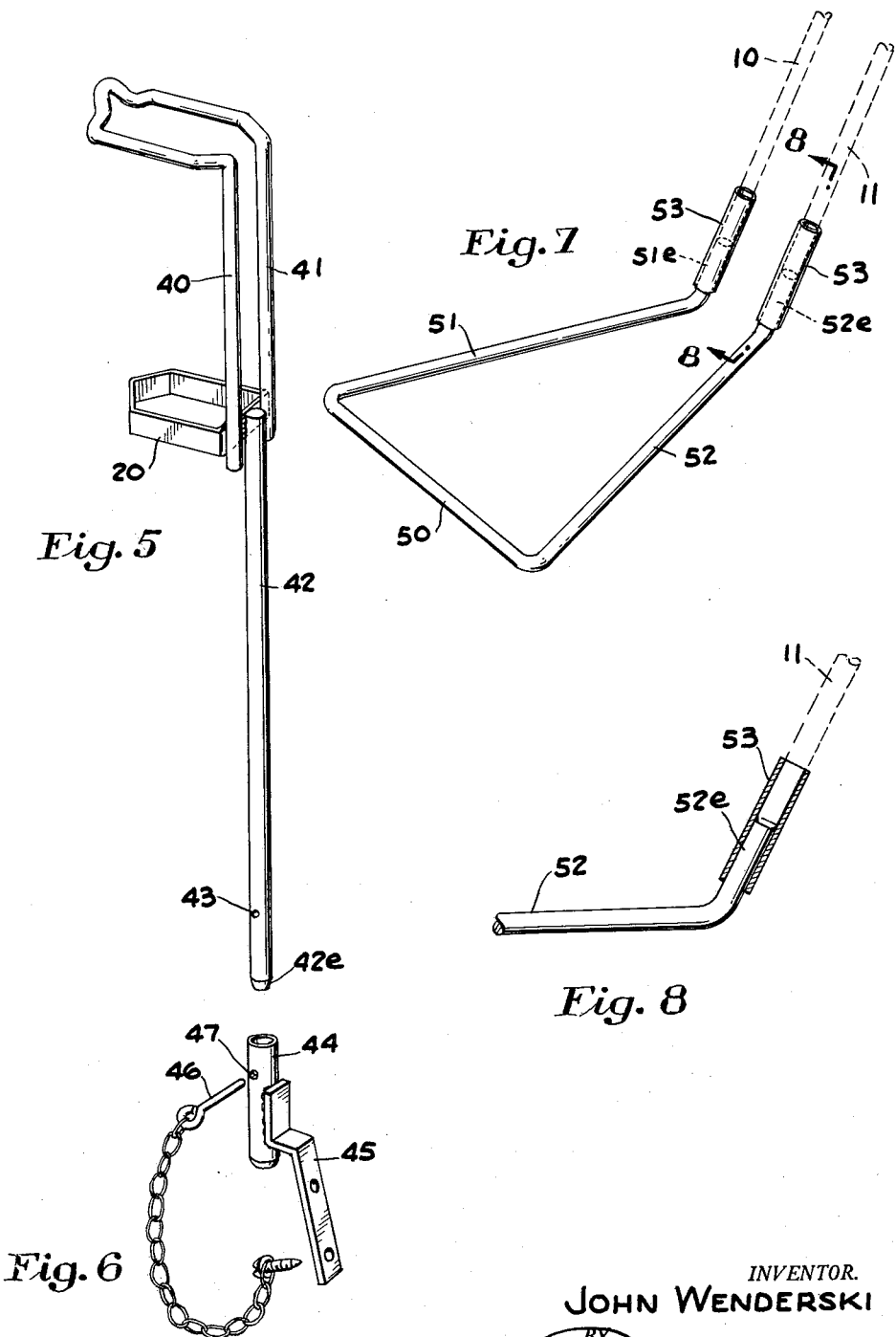
INVENTOR.
JOHN WENDERSKI
BY
Gregory S. Dolgorukov
ATTORNEY

United States Patent Office
3,033,503
Patented May 8, 1962

1

3,033,503
FISHERMAN'S POLE REST AND A HOLDER THEREFOR
John Wenderski, 14933 Toepfer St., East Detroit, Mich.
Filed Dec. 16, 1958, Ser. No. 780,821
2 Claims. (Cl. 248—38)

This invention relates to an improved fisherman's pole rest and a holder therefor.

The need for a safe, convenient and reliable fisherman's pole rest has been felt for many years. Obviously, holding a fishing rod or pole in the hand may be very tiring. Whether fishing is done from the shore or from a boat, it is often desirable to set the rod in such a manner that fishing may be continued but without the necessity of holding the rod in the hand. Often fishing rods or poles are sharpened at their thick end and stuck into the ground. However, this expedient is practicable only with plain poles and cannot be used with poles having special handles and reels provided thereon. Sometimes a forked stick is put in the sand and the rod is placed thereon to be supported substantially at its middle. However, this expedient is practicable primarily with plain poles having sharpened ends and is not appreciably advantageous with poles having reels and special handles.

In case of fishing from a boat, the rod may either be put down in the boat without projecting outwardly from the boat structure or its handle end may be placed between the seat and the side of the boat or between some other elements of the boat structure to have the thin end of the pole extend outwardly. This expedient also has some disadvantages, particularly due to the possibility of the pole falling overboard. On the other hand, when the pole is put on the bottom of the boat or on the seat without protruding outwardly from the boat, the effective length of the pole is greatly reduced, if not completely destroyed.

Numerous constructions of rod holders or rests have been offered. However, all such holders possess a number of disadvantages. Some of such holders are used only in boats and cannot be used when fishing is done from the shore. Others provide various attachments, such as sharp prongs that must be attached to the holder for use on the shore. Some are intended to be used only from the shore and, therefore, have sharp points for sticking into the ground. Such holders are not only unusable in boats but present considerable danger when attempts are made to use them in boats, and they are undesirable for that reason.

One of the objects of the present invention is to provide an improved fisherman's pole rest and a holder therefor whereby the above difficulties and disadvantages are overcome and largely eliminated without introducing other difficulties or increasing appreciably the costs involved.

A further object of the present invention is to provide an improved fisherman's pole rest which can be used from a boat, from the shore or on ice without the necessity of making changes in its construction or attaching to the rest special sharp prongs and similar parts.

A further object of the present invention is to provide an improved fisherman's pole rest which can be used from the shore, in a boat or on ice but in which sharp points are eliminated and which, therefore, does not present any danger in use.

A further object of the present invention is to provide an improved fisherman's rest which is adapted to engage the reel on the pole in such a manner as to hold the pole in place and in such a position as to preserve its original effective length without the possibility of falling either under its own weight or when being pulled out by a fish.

A further object of the present invention is to provide a fisherman's pole rest and a holder therefor which will fit into a tackle box of almost any size or construction.

A still further object of the present invention is to provide an improved fishing pole rest which is made from rolled stock and includes a minimum of parts.

A still further object of the present invention is to provide an improved holder for a fisherman's pole rest which receives and holds the rest and includes a lock preventing turning of the pole in the holder or falling out therefrom.

It is an added object of the present invention to provide an improved fisherman's pole rest and a holder therefor which are simple and rugged in construction, safe and dependable in use, and are relatively inexpensive to manufacture.

Further objects and advantages of this invention will be apparent from the following description and appended claims, reference being had to the accompanying drawings forming a part of this specification, wherein like reference characters designate corresponding parts in the several views.

FIG. 1 is a perspective view of my improved fisherman's pole rest, with the lower end of a pole having a handle and a reel provided thereon being shown in dotted lines in operative position in the rest.

FIG. 2 is a side view of the construction of FIG. 1.

FIG. 3 is a perspective view showing a holder or bracket for the rest of FIG. 1.

FIG. 4 is a fragmentary elevational view showing the lower end of the rest of FIG. 1 in the operative position in the holder of FIG. 3.

FIG. 5 is a view similar in part to FIG. 1 and showing a fisherman's pole rest of a modified construction.

FIG. 6 is a perspective view showing a holder for the rest of FIG. 5.

FIG. 7 is a perspective view showing a modified construction of the holder for a rest of FIGS. 1–4.

FIG. 8 is a fragmentary view, partly in section, showing the end of one bar of the holder of FIG. 7 with the rest leg inserted therein.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention, I discard the former practice of providing pole or rod holders in the form of brackets attachable to parts of boats or other supporting structures, such as docks, and adapted to receive an attachment in the form of sharp prongs for use in the ground. I also discard the practice of providing a rod holder adapted to be used only in a bracket mounted on a supporting structure or only from shore. In accordance with the present invention I provide a rod rest adapted to receive and hold a rod, which rest has legs having rounded ends which, nevertheless, can easily penetrate the ground and are also adapted to be received by special supporting brackets secured to parts of boats or other supporting structures or placed under a box or frozen into the ice, placed under a seat or other part of a boat. For making my improved holder, I utilize rolled stock, such as thick wire. The construction of my improved rest includes a minimum of parts.

In the drawings there is shown, by way of example, fisherman's pole rests and holders therefor embodying the present invention. Referring specifically to FIGS. 1–4, the rest illustrated therein comprises a frame of inverted U shape made of thick wire. The legs of the U form the legs 10 and 11 of the frame. The connecting portion of the U is bent forwardly substantially at a 90° angle to the legs 10 and 11 to form a loop 12 adapted to receive a handle 13 of a fisherman's pole 14. A tongue 15 is formed on the loop to extend forwardly and upwardly therefrom at an angle of approximately 45°, as is best shown in FIG. 2. The tongue 15 is adapted to engage a bar 16 of the fishing reel 17 provided on the pole 14 and to hold the pole more securely in place. It will be noted that because of the spacing of the legs 10 and 11, the finger grip 18 of the pole handle is held securely between them preventing rotation of the handle and reel. A ring 20 is welded or otherwise secured to the frame at such a distance from the loop 12 thereof as to accommodate and hold the end of the handle 13 of the pole and thus to prevent it from tipping over. The entire frame is made from a thick metal wire preferably by stamping operations. The ring 20 may be made from strip metal or from thick wire and spot welded or otherwise secured to the legs 10 and 11.

The ends 10e and 11e of the legs 10 and 11 are rounded and are provided with holes 21 and 22 for the purposes hereinafter explained. I have found that rounding of the ends of the legs 10 and 11 is entirely sufficient to enable the user to force the rest into the ground when the same is used from the short and that provision of sharp points is neither necessary nor desirable on such rests. By virtue of such an expedient the danger of accidents is eliminated, and when holders are used, only short portions of the leg ends need to enter such holders.

The rest described above, in addition to being usable when stuck in the ground, may also be used in a boat, on a boat. Some of them may also be connected to docks, as the one illustrated in FIG. 3, may be secured. The holder comprises a short metal bracket including a tongue 26 bent at an angle as illustrated and provided with holes 27 for screws, nails or similar connectors. To the angular portion 28 of the bracket there are welded or otherwise secured bullet-shaped receiver tubes 29 provided with holes 30. A pin 31 secured to the angular portion 28 of the bracket with the aid of a chain 32 is adapted to be passed through the holes 30 and the holes 21 and 22 in the legs 10 and 11 of the rest, thus locking the rest in place and preventing its withdrawal or falling out from the holder.

The user may have a number of holders such as the one shown in FIG. 3 mounted or secured to various places in a boat. Some of them may also be conected to docks, rafts and similar constructions. A user of the rest may then use the same in any desired position on the boat determined by the position of the holder and the angle at which the tongue 26 thereof is bent. He may also use the rest from the shore as well as in a large variety of other situations and positions.

FIG. 5 illustrates a fisherman's pole rest of a modified construction, with the main difference being in the fact that the legs 40 and 41 of the frame of the rest of FIG. 5 are much shorter than the legs 10 and 11 of the construction of FIG. 1. A single leg 42 is welded or otherwise secured either to the wire legs 40 and 41 or to spring 20, as in the present embodiment. In spite of the use of a single leg 42, use of the leg portions 40 and 41 preserves the advantage of having a hold for the finger rest of the handle, similarly to the construction of FIGS. 1–4. The end 42e of the leg 42 is rounded and is provided with a hole 43. This end is adapted to enter the tubular receiver 44 of the holder shown in FIG. 6 and including a bracket 45 to which the receiver 44 is welded or otherwise secured. A locking pin 46 is adapted to pass through the hole 47 in the receiver 44 and the hole 43 registering with said hole 47 when the end 42e is inserted into the receiver 44, thus locking the rest in the holder, both from longitudinal as well as from rotative movements therein. The use of the rest of FIGS. 5 and 6 is substantially similar to that described with respect to the construction of FIGS. 1–4.

The holder of FIGS. 7 and 8 is adapted to receive the two-leg rest, such as the one shown in FIGS. 1 and 4, and it may be used either from the shore, on the ice, in a boat, on a dock, etc. This holder comprises a piece of wire preferably similar or identical to that from which the frame of the rest is made. The piece of such wire is bent to a substantially triangular shape to include a base 50 and sides 51 and 52. Instead of coming together at a vertex, the free ends of the sides 51 and 52 are bent upwardly at approximately 120° angles to the general plane of the holder to extend parallel to each other at a distance substantially the same as that at which the legs 10 and 11 of the rest are spaced. Tubular pieces 53 and 54 are secured to the ends 51e and 52e of said sides 51 and 52 and are adapted to receive the ends of the legs 10 and 11 as is best shown in FIGS. 7 and 8.

In use, the holder of FIGS. 7 and 8 may be placed under a tackle box, a rock, a log, a tree root or some other heavy or fixed object. In a boat, the base of the holder may be stuck under a plank or other structure of the boat. In using the holder from docks and rafts, it may be stuck under some structural part thereof or have a heavy object placed thereon. In winter, the holder may be frozen into the ice or into a pail of snow which may be wetted and frozen. Also, the holder will fit into almost any size tackle box. Because of the above described construction of the holder, other numerous uses thereof will occur to any user thereof faced with particular conditions.

There is thus provided the improved fisherman's pole rest and a holder therefor whereby the objects of the present invention listed above and numerous additional advantages are attained.

I claim:

1. A fisherman's pole rest comprising a frame made of a single piece of rolled stock bent to an inverted U shape, with the connecting portion of the U being bent forwardly substantially at a 90° angle to the legs thereof to form a loop adapted to receive the top of the pole handle, with the legs of the U being spaced substantially closer than the width of the loop for receiving the finger grip and thus to prevent rotation of the pole in the rest, a tongue formed on said loop at approximately 45° angle to the plane of said loop, said tongue being adapted to engage a bar of a reel when a pole with a reel is inserted into said loop and to resist the component of weight of the pole acting within the plane of said loop, and a fully enclosed ring substantially of similar configuration and size as those of said loop provided on said legs to connect the same together and at such distance from said loop as to hold the end of the pole handle from side movements in any direction, whereby said rest is made operative to support a fisherman's pole in vertical as well as horizontal and intermediate positions.

2. A holder for a fisherman's pole rest defined in claim 1, said holder comprising a single piece of rolled stock bent to a triangular shape to have two sides and a base, the two sides of the triangle having their free ends bent at approximately 120° angle to the general plane of the triangle, with said bent ends extending parallel to each other and pointing away from said base, two receiver tubes secured respectively on said free ends to provide two hollows adapted to receive the two free ends of the two legs of the pole rest, with said sides and the base of the triangle being adapted to receive a holddown weight for counterbalancing the weight of the rest and of the pole when the legs of the rest are inserted into said hollows.

References Cited in the file of this patent

UNITED STATES PATENTS

| | | |
|---|---|---|
| 332,917 | Markham | Dec. 22, 1885 |
| 945,520 | Greenwood | Jan. 4, 1910 |
| 965,826 | Lynch | July 26, 1910 |
| 1,078,817 | Austin | Nov. 18, 1913 |
| 2,683,008 | Roederer | July 6, 1954 |
| 2,833,500 | Jones | May 6, 1958 |

FOREIGN PATENTS

| | | |
|---|---|---|
| 150,071 | Great Britain | Aug. 27, 1920 |
| 409,449 | Great Britain | May 3, 1934 |